United States Patent [19]

Hagar

[11] 4,235,460
[45] Nov. 25, 1980

[54] EXPANSION JOINT

[76] Inventor: Donald K. Hagar, 2439 Walnut St., Allentown, Pa. 18104

[21] Appl. No.: 932,613

[22] Filed: Aug. 10, 1978

[51] Int. Cl.³ .............................................. F16L 51/02
[52] U.S. Cl. .................................... 285/229; 285/158; 285/236
[58] Field of Search ............... 285/229, 226, 227, 228, 285/235, 223, 299, 236, 235, 424, 158; 428/236, 251

[56] References Cited

U.S. PATENT DOCUMENTS

| | | | |
|---|---|---|---|
| 631,376 | 8/1899 | McCreery | 285/236 X |
| 2,012,108 | 8/1935 | Raney | 138/138 |
| 2,068,533 | 1/1937 | Coffman | 428/591 |
| 2,561,891 | 7/1951 | Tucker | 310/75 B |
| 2,703,772 | 3/1955 | Keithly | 428/285 |
| 3,109,670 | 11/1963 | Engel | 285/114 |
| 3,183,022 | 5/1965 | Sayag | 285/93 |
| 3,203,849 | 8/1965 | Katz et al. | 428/246 |
| 3,315,704 | 4/1967 | Shire | 285/226 X |
| 3,413,180 | 11/1968 | Smith | 428/252 |
| 3,460,856 | 8/1969 | Van Tine et al. | 285/236 X |
| 3,522,074 | 7/1970 | Kalleberg et al. | 428/246 |
| 3,551,009 | 12/1970 | Cammuso et al. | 285/226 |
| 3,647,247 | 3/1972 | Pintard et al. | 285/235 X |
| 3,654,966 | 4/1972 | Waksman | 138/141 |
| 3,655,224 | 4/1972 | Carberry et al. | 285/93 |
| 3,768,842 | 10/1973 | Ahlstone | 285/55 |
| 3,769,146 | 10/1973 | Ravel | 428/219 |
| 3,808,087 | 4/1974 | Milewski et al. | 428/86 |
| 3,811,714 | 5/1974 | Pintard | 285/229 |
| 3,916,954 | 11/1975 | Hohhausen | 138/149 |
| 3,935,355 | 1/1976 | Kuhn | 24/150 R |
| 4,025,680 | 5/1977 | Botsolas et al. | 428/113 |

FOREIGN PATENT DOCUMENTS

| | | | |
|---|---|---|---|
| 610011 | 12/1960 | Canada | 285/226 |
| 2408885 | 9/1975 | Fed. Rep. of Germany | 285/229 |
| 2266095 | 9/1975 | France | 285/227 |

*Primary Examiner*—Thomas F. Callaghan
*Attorney, Agent, or Firm*—Schwartz, Jeffery, Schwaab, Mack, Blumenthal & Koch

[57] ABSTRACT

An expansion joint for coupling conduits through which high temperature fluids are conveyed and accommodating severe vibrations and movements imparted to the conduits during the flow of fluids therethrough. The joint includes a pair of opposed frame sections for connection to the adjacent ends of the conduits being coupled. A connector of flexible fluid impervious fabric bridges and seals the space between the frame sections to provide a flexible and fluid-tight joint having both high heat resistance and high corrosion resistance. The ends of the fabric connector have portions, at corners of the connector, in which the fabric is folded back on itself to contribute to forming bloused corners. The bloused corners relieve stresses in the fabric connector to reduce the possibility of rupture.

10 Claims, 10 Drawing Figures

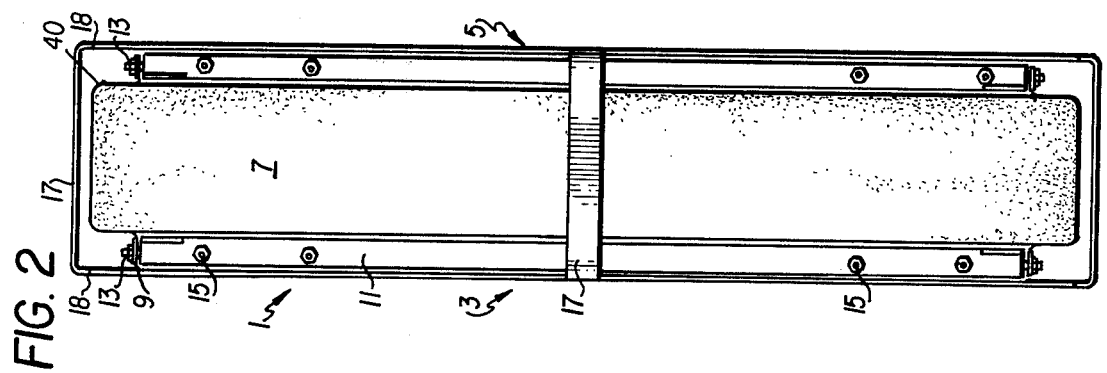
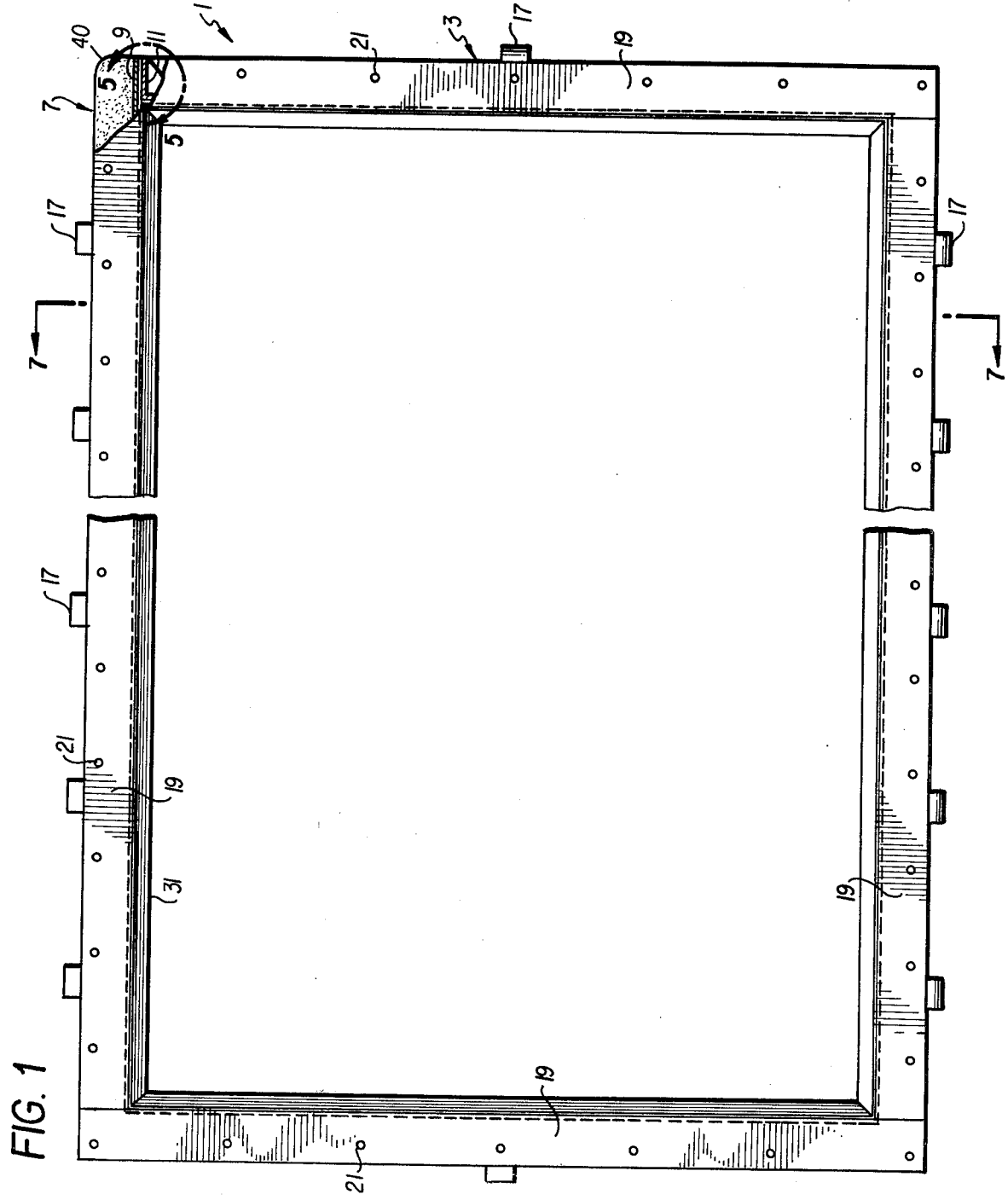

EXPANSION JOINT

BACKGROUND OF THE INVENTION

1. Field of the Invention

The present invention generally relates to expansion joints for use in coupling conduits that are utilized in conveying gaseous fluids at high temperatures.

2. Description of the Prior Art

In certain conduit installations, it is often desirable to utilize a joint structure for coupling the conduits together whereby lateral or longitudinal movements of the conduits may be effectively accommodated by the joint. Such joints are typically known as expansion joints and absorb expansion and contraction movements when vibrations and other forces are imparted to the coupled conduits during fluid flow therethrough. Expansion joints have heretofore been proposed in many configurations, such as sheet metal bellows having one or more annular bulges, tubular sleeves and multilayered laminates of various insulating materials.

To be effective, an expansion joint must be capable of accommodating both longitudinal and lateral movements of the coupled conduits, including extreme vibrations and other irregular movements. Further, since an expansion joint is often utilized in high temperature applications, it is important that the joint be capable of maintaining its physical integrity in such environments. Moreover, it is also highly desirable that an expansion joint be capable of resisting the corrosive action of chemicals and providing effective sealing against leakage of gaseous fluids under all anticipated operating conditions.

SUMMARY OF THE INVENTION

It is an object of the invention to provide an improved expansion joint which is extremely simple in construction and provides an absolute seal against the escape of gaseous fluids being conveyed through the conduits coupled by the joint.

It is another object of the invention to provide an improved expansion joint which is extremely flexible, has high tensile strength and is capable of accommodating relative lateral, longitudinal and vibrational movements of the conduits being coupled thereby.

It is yet another object of the invention to provide an improved expansion joint having high resistance to heat and chemical attack from fluids being conveyed therethrough.

The present invention achieves these and other objects by providing an improved expansion joint structure that includes two spaced, generally rectangular frame sections, each having four corners, which connect to the corresponding adjacent portions of the conduits being coupled. Each frame section defines an opening therethrough which is generally coaxial with the passageway of a conduit in which the expansion joint is used. A fabric assembly or connector including two layers of high heat resistance material with a thin fluid impervious layer disposed therebetween is supported by peripheral rods carried by the frame sections and is secured to the latter by means of detachable retainers. The connector or fabric assembly preferably includes two layers of woven fiberglass with a thin layer of super alloy metal disposed therebetween. The connector has opposite ends and a plurality of inner corners corresponding to the corners of the frame sections.

The connector has at each inner corner in the region of each end of the connector an outwardly extending portion which is folded back on itself so that at least two segments of fabric material overlie each other at each folded back portion. The folded back portions contribute to forming bloused corners in the connector to provide flexibility therein. This relieves stresses in the connector and reduces the possibility of a rupture occurring.

The expansion joint includes means, at each inner corner of each frame section and extending outwardly away from the opening of each frame section, for clamping each folded back portion into its folded back condition. This clamping means includes a pair of opposed surfaces, and the folded back portion is disposed between the opposed surfaces.

The expansion joint includes a plurality of detachable retainers cooperating with the frame sections to secure the ends of the connector to the frame section. At least a portion of each retainer is in the form of a flat strip. At least certain of such strips have outwardly turned flange sections. One of the aforementioned opposed surfaces of the clamping means is provided by part of the flat strip of one retainer, and the other of the opposed surfaces is provided by the outwardly turned flange of another detachable retainer. Thus, the opposed surfaces cooperate with each other to maintain the folded back portions in the folded back condition.

A fastener extends between the parts of the retainers providing the opposed surfaces and extends through the folded back portion of the fabric connector disposed therebetween. The opposed surfaces are disposed in planes which are generally parallel to the direction of the fluid flow through the conduits.

These and other objects of the present invention will be apparent from the following description and appended claims, reference being to the accompanying drawings forming a part of the specification wherein like reference characters designate corresponding parts of the several views.

BRIEF DESCRIPTION OF THE DRAWINGS

FIG. 1 is an elevational view, taken from the exit end of a first embodiment of an expansion joint according to the invention;

FIG. 2 is a side view of the expansion joint shown in FIG. 1;

DETAILED DESCRIPTION OF THE PREFERRED EMBODIMENTS

Figure 4:
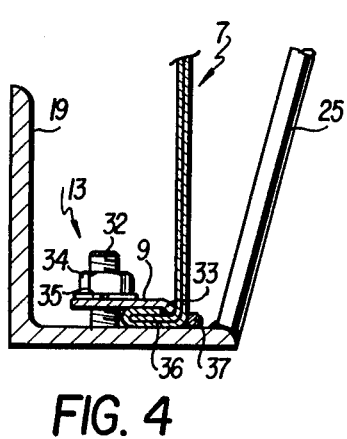
FIG. 4 is an enlarged fragmentary cross-sectional view of one means for retaining an edge of the fabric assembly to a frame section.

A first embodiment of an expansion joint 1 according to the invention is shown in FIGS. 1 and 2 as including a pair of spaced frame sections 3 and 5 having corresponding generally rectangular configurations. Sections 3 and 5 are bridged or joined together by a connector or fabric assembly 7 which encircles the inner peripheral edges of sections 3 and 5 and is secured thereto by a plurality of first retainer strips 9 and a plurality of second retainer strips 11. Strips 9 are detachably secured to frame sections 3 and 5 by a plurality of bolt assemblies 13. Similarly, strips 11 are detachably secured to frame sections 3 and 5 through a plurality of bolt assemblies 15.

Joint 1 may also be provided with a plurality of U-shaped bars 17 welded to the outer peripheral edges of frame sections 3 and 5, as indicated at 18 in FIG. 2. Bars 17 are utilized for presetting and aligning joint 1 during its coupling to the associated conduits or ducts and serve to provide overall rigidity to joint 1 since fabric assembly 7 is flexible. After installation, bars 17 are removed by undoing welds 18, thereby permitting joint 1 to expand, contract or otherwise flex through fabric assembly 7.

Figure 3:
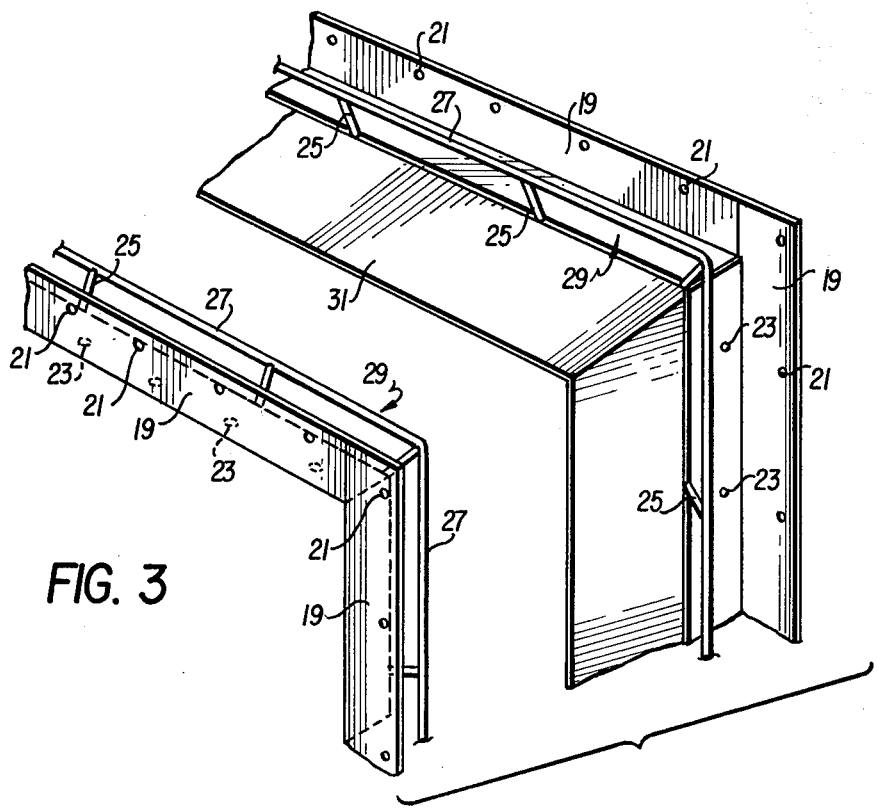
FIG. 3 is a fragmentary perspective view of the frame sections of the expansion joint shown in FIG. 1.

Referring to FIG. 3, frame sections 3 and 5 are each preferably constructed from four metal right angle sections 19 secured together at corresponding corners through welding or the like. The outer faces of sections 19 are provided with a plurality of apertures 21 for connection to adjacent ends of the conduits or ducts to be coupled as shall be hereinafter described. The inner portions of sections 19 are provided with apertures 23 for securing retainers 9 and 11 thereto.

Frame sections 3 and 5 each include a plurality of inwardly directed struts 25 made from short sections of round metal bar stock or the like, with each strut 25 having one end welded to an inner peripheral edge of section 19. A plurality of support rods 27 are secured to the free ends of struts 25, such as by welding or the like, to define a pair of substantially rectangular-shaped support frames 29 on frame sections 3 and 5. A tapered sleeve or liner 31 is secured to frame section 5, the latter being the inlet frame section for joint 1. Liner 31 serves to direct fluid flow through frame section 3 and prevents direct contact or impact of fluids against the inner surface of fabric assembly 7. Liner 31 may be fabricated from four sheets of metal having substantially trapezoidal configurations and may be welded to frame section 5 by welding the four larger side edges thereto.

The manner in which fabric assembly 7 is secured to frame sections 3 and 5 shall now be described with reference to FIGS. 4 and 5. Angle section 19 defining one upper horizontal portion of frame section 3 or 5 includes a stud 32 which is threadedly received within aperture 23, the latter also provided with corresponding female threading. Retainer 9, in the form of an elongated rectangular strip having a downwardly turned lip portion 33 along one longitudinal edge thereof, is provided with a plurality of corresponding apertures (not shown) which fit over a plurality of studs 32. By tightening a plurality of nuts 34 and corresponding flat washers 35 downwardly on studs 32, lip 33 of retainer 9 is caused to overlap a folded peripheral edge 36 of fabric assembly 7. This serves to securely retain edge 36 against angle section 19. A round metal rod 37 may be secured to angle section 19, such as by welding, to provide an abutment against which lip 33 presses edge 36 to provide an even more effective and secure sealing of fabric assembly 7 to frame sections 3 and 5.

Figure 5:
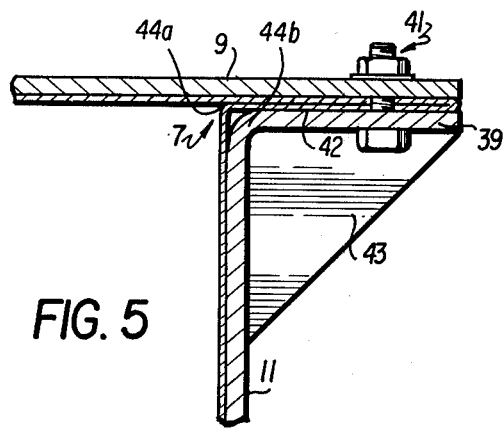
FIG. 5 is an enlarged cross-sectional view encircled by line 5—5 FIG. 1.

As depicted in FIG. 5, each end of retainer 9 is secured to an outwardly turned flange portion 39 provided at the opposite ends of each retainer 11 by means of a fastener consisting of a nut and bolt assembly 41. As also shown, a portion of fabric assembly or connector 7 is folded back on itself to form a folded back portion 42 which provides a "bloused" fabric corner 40. Folded back portion 42 is clamped between retainer 9 and 11 through bolt assembly 41. This manner of folding fabric assembly 7 provides important stress relief at corner portions thereof and prevents rupturing of fabric assembly 7 during use at these high stress locations. As seen in FIGS. 2 and 5, fabric corner 40 extends outwardly from the general perimeter of frame section 3. This configuration is the same for all such corners 40 and distinguishes from known techniques for securing bellows assemblies to a frame wherein such assemblies basically conform entirely to the perimeter of the frame. That is, the folded back corners of the present invention allow the fabric assembly to extend substantially radially outwardly of the perimeter of the frame. It will be appreciated from the drawing that the fabric connector defines a rectangular opening at the ends and that this opening has inner corners 44a (see FIG. 5 in which one such corner 44a is shown) corresponding generally to corners 44b of the inside of the frame (one such corner 44b also being shown in FIG. 5).

Retainer 11 is essentially in the form of a flat strip that may be secured against the inwardly directed portions of angle sections 19 defining the sides of frame sections 3 and 5 for pressing the vertical edges of fabric assembly 7 thereagainst. This is achieved through bolt assemblies (not shown) which are similar to bolt assemblies 13 previously described for securing retainers 9. A reinforcing plate 43 may be disposed at each end of retainer 11 to impart additional strength to the joint structure held together by bolt assembly 41.

Figure 6:
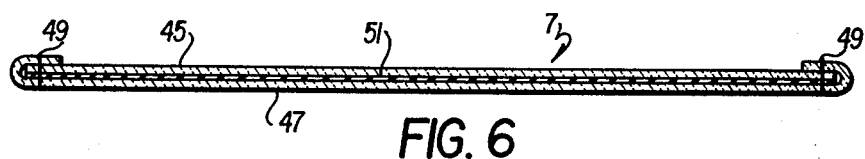
FIG. 6 is a cross-sectional view depicting the construction of the fabric assembly utilized in the first embodiment of the invention.

The structural configuration of fabric assembly 7 is shown in FIG. 6. As shown therein, fabric assembly 7 includes a first layer of heat resistant material 45 secured to a second layer of heat resistant material 47 by folding and stitching the longitudinal edges of layer 47 against layer 45, as shown at 49, in order to form a basic two-ply assembly. A thin barrier 51 of fluid impervious material is disposed and secured between layers 45 and 47. Layers 45 and 47 are preferably woven from high heat resistant material, such as fiberglass or the like, so that fabric assembly 7 may retain approximately 50% of its tensile strength at around 700° F. and is suitable for withstanding high operating temperatures of around 800° F. and higher. Because of the preferred woven nature of layers 45 and 47, only two relatively thin plies of this material are required to provide the necessary physical strength and integrity under adverse operating conditions. Fabric assembly 7 may be in the form of a long rectangular strip having its end edges joined by stitching or, alternatively, may be in the form of a continuous loop.

Barrier 51 is preferably a thin metal foil and is most advantageously of super alloy metal such as Inconel 600, Inconel 625, Hastelloy C-276, or the like, with such alloys being well known for their high corrosion resistance. These alloys are typically of less than about fifty percent iron, with chromium, nickel and cobalt being the major alloying constituents. Barrier 51 is preferably on the order of 0.5–1.5 thousandths of an inch thick and is completely impervious to fluid flow therethrough and has high resistance to chemical attack.

The construction of fabric assembly 7 permits layers 45 and 47 to attain the temperature of fluids flowing through joint 1, while completely preventing the escape of fluids therethrough by virtue of barrier 51. Thus, fabric assembly 7 maintains its physical integrity through temperature capable layers 45 and 47 and provides an absolute seal against fluid loss through impervious barrier 51.

Figure 7:
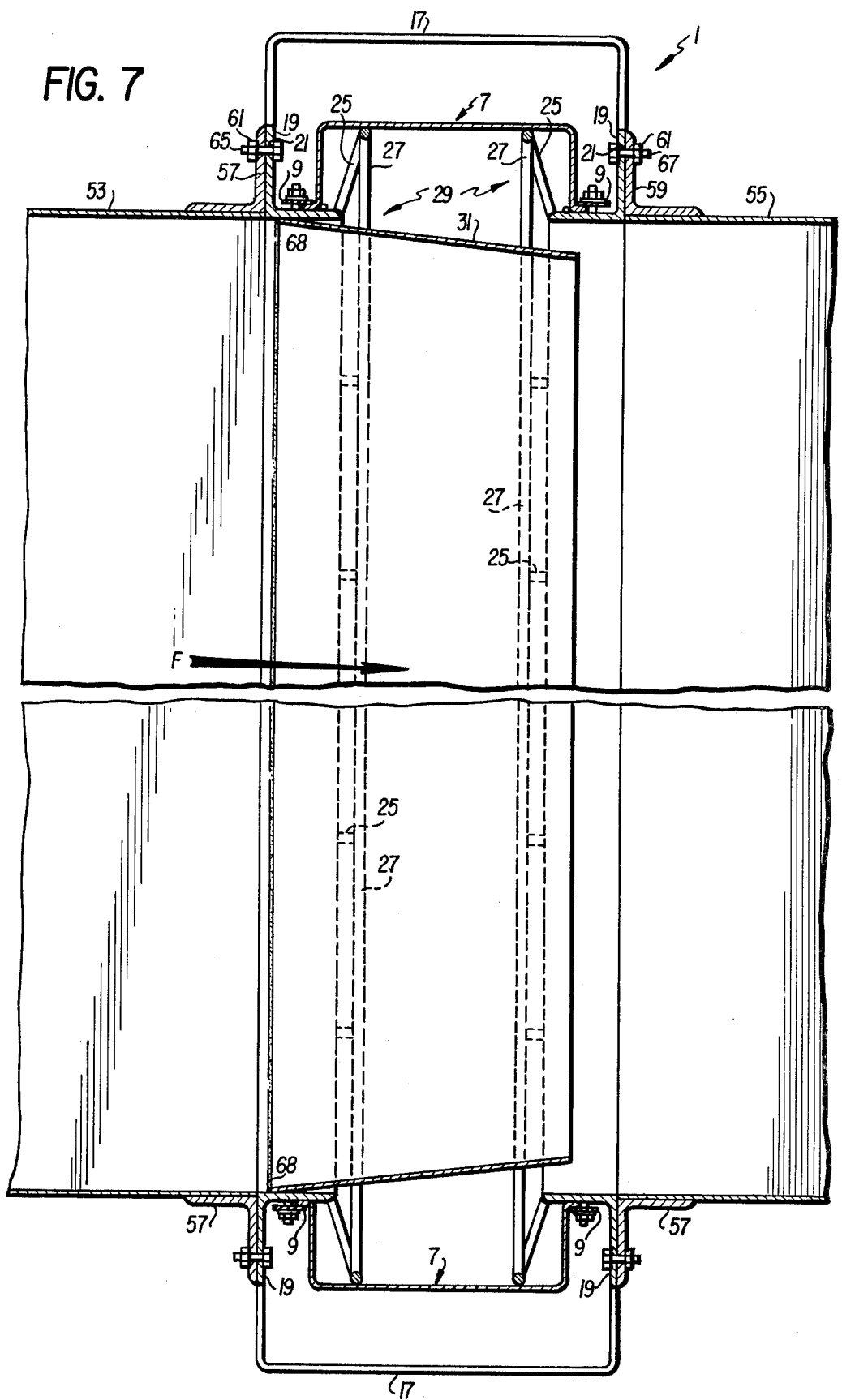
FIG. 7 is a vertical cross-sectional view of the expansion joint taken along the line 7—7 of FIG. 1 and shown installed in a duct system.

One manner in which expansion joint 1 may be installed within a duct or conduit system shall now be described with reference to FIG. 7. Bars 17 are utilized for presetting and aligning joint 1 between adjacent ends of ducts 53 and 55, after which bars 17 may be removed from joint 1 as previously indicated. Angle sections 19 are secured to corresponding faces of similar angle sections 57 and 59 provided on the ends of ducts 53 and 55, respectively. This is achieved by utilizing a plurality of nut and bolt assemblies 61 which are secured through apertures 21 provided in sections 19 and corresponding apertures 65 and 67 provided in sections 57 and 59, respectively. Liner 31, secured to frame section 5 by welding as indicated at 68, tapers downwardly towards frame section 3 in the direction of fluid flow, as generally indicated by arrow F. Fabric assembly 7, being of a substantially circular sleeve-like configuration, is supported around the outer surfaces of support frames 29, with the peripheral edges of fabric assembly 7 being securely attached against angle sections 19 by means of retainers 9 and 11 as previously described. It is therefore apparent that movement of ducts 53 and 55 longitudinally or traversely of the direction of fluid flow as indicated by arrow F is accommodated by the flexible nature of fabric assembly 7. Fluids being conveyed through joint 1 is prevented from escaping to the exterior thereof by virtue of fluid impervious barrier 51 forming an essential part of the structural configuration of fabric assembly 7 as previously described.

Figure 8:
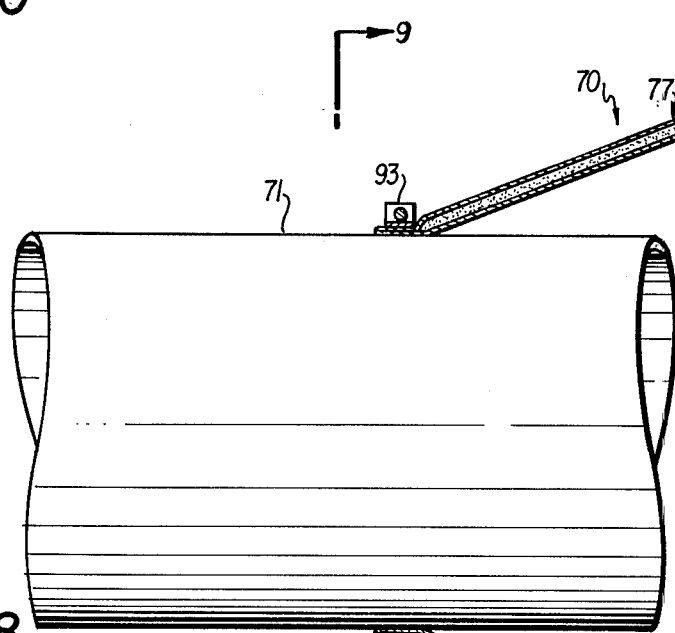
FIG. 8 is a vertical cross-sectional view of a second embodiment of the invention.
Figure 9:
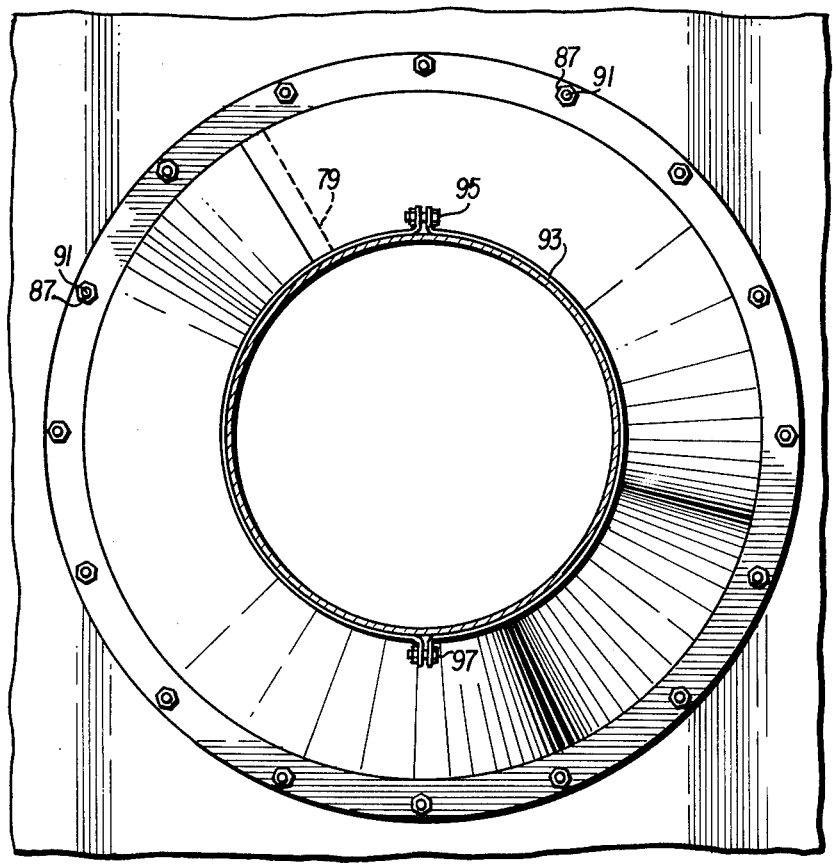
FIG. 9 is a vertical cross-sectional view taken along the line 9—9 of FIG. 8.

Another embodiment of an expansion joint according to the invention is shown in an installed condition in FIGS. 8 and 9. An expansion joint 70 is depicted as having a generally tapered or conical configuration for installation between a conduit 71 and an apertured wall 73 having an effective opening 75 of greater diameter than the effective diameter of conduit 71.

Joint 70 includes a fabric assembly 77 which is essentially in the form of a curved strip that is sewn together along its short edges as shown at 79. The larger circular edge of fabric assembly 77 is secured around the periphery of aperture 75 by means of a flat mounting ring 81 that is attached around the periphery of opening 75 by welding, as generally indicated at 83. The effective opening defined by ring 81, as shown in FIG. 8, may be slightly smaller than that of aperture 75. The corresponding peripheral edge of fabric assembly 77 is folded outwardly and tightly sealed against mounting ring 81 by a flat retainer ring 85. This is achieved through the use of a plurality of threaded bolts 87 secured to mounting ring 81 and passing through retainer ring 85, the latter being tightened thereon against fabric assembly 77 by a plurality of nuts 91. The smaller circular edge of fabric assembly 77 is secured to conduit 71 by a ring clamp 93 which is tightened and loosened through a pair of nut and bolt assemblies 95 and 97.

As is apparent from FIGS. 8 and 9, fabric assembly 77 serves as the basis of a flexible joint connection coupling conduit 71 to opening 75 of wall 73, thereby accommodating any relative movements between conduit 71 and wall 73, while maintaining an absolute seal against leakage of fluids being conveyed therethrough.

Figure 10:
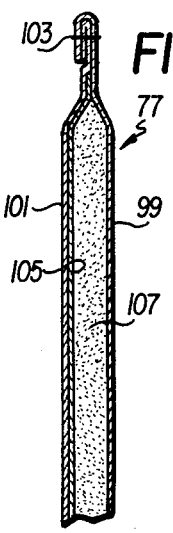
FIG. 10 is a cross-sectional view depicting the construction of the fabric assembly utilized in the second embodiment of the invention.

Referring now to FIG. 10, fabric assembly 77 of this embodiment includes a first layer 99 of high temperature resistant material having its outer edges folded and secured to a second layer 101 of high temperature resistant material, as generally indicated at 103. A thin impervious metallic barrier 105 is disposed against layer 101 and a layer of heat insulation material 107 is disposed between barrier 105 and opposite layer 99. Material 107 may comprise any loose, felted or woven heat insulation material, for example, mineral wool having a density of about 6.2 pounds per cubic foot. Layers 99 and 101 are preferably woven fiberglass or other similar high density material such as previously described for fabric assembly 7 of the first embodiment. Similarly, barrier 105 is preferably a thin super alloy metallic foil made from Inconel 600, Inconel 625, Hastelloy C-276, or the like.

Though fabric assembly 77 is somewhat thicker than that of previously described fabric assembly 7 by virtue of the inclusion of heat insulation layer 107, it is nevertheless substantially more flexible and significantly stronger than known joints of this type utilizing many layers of felted material.

It is again seen that the construction of an expansion joint according to the invention, particularly with respect to the specific structural configuration of the fabric assembly, provides an extremely effective seal and strong flexible joint for use in applications of high temperatures and severe corrosive atmospheres. By utilizing high tensile strength fabric, preferably of a densely woven nature, in the fabric assembly, the expansion joint is fully capable of accommodating severe vibrations and all relative movements between the conduit or duct components being coupled by the joint. The super alloy impervious barrier serves to provide a secure and long lasting seal against the passage of any fluids through the fabric assembly.

It is to be understood that the embodiments of the invention herewith shown and described are to be taken as preferred examples of the same, and that various changes in the shapes, size and arrangement of parts and compositions may be resorted to, without departing from the spirit of the invention or scope of the subjoined claims.

What is claimed is:

1. An expansion joint to be interposed between sections of a conduit to accommodate relative movement between the conduit sections, the expansion joint comprising:
   a pair of frame sections, each frame section being for attachment to one conduit section;
   a sleeve-like connector of flexible fabric material, said connector having opposite ends, each end being coupled to one of said frame sections, said connector having a plurality of inner corners;
   said connector having at each inner corner in the region of each end a substantially continuous outwardly extending portion which is folded back on itself so that at least two segments of fabric material overlie each other at each folded back portion;

said folded back portions contributing to forming bloused corners in said connector, said bloused corners including portions disposed outwardly of said inner corners to relieve stresses in said connector and to reduce the possibility of rupturing of the connector.

2. The joint of claim 1:
(a) including means for securing said connector to said frame sections, and
(b) wherein the securing means includes a plurality of detachable retainers.

3. The joint of claim 2 wherein each frame section further includes:
(a) a plurality of inwardly directed struts, and
(b) a plurality of elongate members carried by the struts for supporting the fabric assembly intermediate its opposite edges.

4. The joint of claim 1 further including a liner having a substantially tapered configuration carried by one frame section for directing fluid flow along the longitudinal axis of the conduit sections.

5. The joint of claim 2 wherein:
(a) each frame section is substantially of a rectangular configuration,
(b) the ends of the connector are each secured around the periphery of a frame section, and
(c) each folded back portion is clamped by the detachable retainers and extends generally outwardly from the periphery of its associated frame section.

6. An expansion joint to be interposed between sections of a conduit having a passageway therethrough to accommodate relative movement between the conduit sections, the expansion joint comprising:
a pair of generally rectangular frame sections, each frame section having four corners, each frame section being for attachment to one conduit section, each frame section defining an opening therethrough which is generally coaxial with the conduit passageway;
a sleeve-like connector of flexible fabric material extending between said frame sections, said connector having opposite ends and a plurality of inner corners corresponding to the corners of said frame sections;
said connector having at each inner corner in the region of each end an outwardly extending portion which is in a condition of being folded back on itself;
means, at each inner corner of each frame section and extending outwardly away from the opening of each frame section, for clamping each folded back portion into said folded back condition, said clamping means including a pair of opposed surfaces, said folded back portion being disposed between said opposed surfaces;
said folded back portions contributing to forming bloused corners in said connector, said bloused corners including portions disposed outwardly of said inner corners to relieve stresses in said connector and to prevent rupturing of the connector.

7. An expansion joint as defined in claim 6 including a plurality of detachable retainers cooperating with said frame sections to secure said ends of said connector to said frame sections, at least a portion of each retainer being in the form of a flat strip, at least certain of said strips having an outwardly turned flange section, one of said opposed surfaces of said clamping means being provided by part of said flat strip of one retainer, the other of said opposed surfaces comprising at least part of said outwardly turned flange of another detachable retainer, whereby said opposed surfaces cooperate with each other to maintain said folded back portions in the folded back condition.

8. An expansion joint as defined in claim 7 wherein said clamping means includes a fastener extending between the parts of said retainers providing said opposed surfaces and extending through said folded back portion of said connector disposed therebetween.

9. An expansion joint as defined in claim 7 wherein said opposed surfaces are disposed in planes which are generally parallel to the direction of fluid flow through the conduits.

10. An expansion joint to be interposed between sections of a conduit having a passageway therethrough to accommodate relative movement between the conduit sections, the expansion joint comprising:
a generally rectangular frame section, said frame section having four corners, said frame section being for attachment to one of the conduit sections, said frame section defining an opening therethrough which is generally coaxial with the conduit passageway;
a sleeve-like connector of flexible fabric material, said connector having opposite ends, at least one of said ends having a plurality of inner corners corresponding to the corners of said frame section, said one of said ends being coupled to said frame section;
means adjacent the other of said ends of said connector for coupling the same to the other conduit section;
said connector having at each inner corner an outwardly extending portion which is in a condition of being folded back on itself;
means, at each inner corner of said frame section and extending outwardly away from the opening of said frame section, for clamping each folded back portion into said folded back condition, said clamping means including a pair of opposed surfaces, said folded back portion being disposed between said opposed surfaces;
said folded back portions contributing to forming bloused corners in said connector said bloused corners including portions disposed outwardly of said inner corners to relieve stresses in said connector and to prevent rupturing of the connector.

* * * * *